United States Patent [19]

Lindae et al.

[11] Patent Number: 4,697,225

[45] Date of Patent: Sep. 29, 1987

[54] HEADLAMP, PARTICULARLY OF RECTANGULAR CONFIGURATION, FOR USE AS ANTIDAZZLE LAMP ON MOTOR VEHICLES

[75] Inventors: Gerhard Lindae, Leonberg; Peter Perthus, Stuttgart; Heinz Rein, Reutlingen, all of Fed. Rep. of Germany

[73] Assignee: Robert Bosch GmbH, Stuttgart, Fed. Rep. of Germany

[21] Appl. No.: 893,895

[22] Filed: Jul. 29, 1986

[30] Foreign Application Priority Data

Aug. 31, 1985 [DE] Fed. Rep. of Germany ....... 3531223

[51] Int. Cl.[4] .............................................. B60Q 1/00

[52] U.S. Cl. ...................................... 362/61; 362/309; 362/297; 362/348

[58] Field of Search .................. 362/61, 80, 307, 308, 362/309, 347, 348, 350, 297, 310, 311

[56] References Cited

U.S. PATENT DOCUMENTS 4,530,042 7/1985 Cible et al. ............................ 362/61

FOREIGN PATENT DOCUMENTS

EP31211 7/1981 European Pat. Off. .............. 362/61

82302 12/1963 France ................................ 362/308

*Primary Examiner*—James C. Yeung

*Attorney, Agent, or Firm*—Michael J. Striker

[57] ABSTRACT

A low beam headlamp includes a reflector defining an optical axis and an incandescent filament forming a cylindrical coil whose central axis extends in a horizontal plane through the focal point and forms right angles with the optical axis. The light reflecting surface of the reflector is divided into six zones of which two lateral zones when viewed in the direction of the optical axis form together a paraboloid sector. The upper left hand wall portion and a lower right hand wall portion form together a second paraboloid sector whose central axis is inclined upwards relative to a central axis of the first paraboloid sector. An upper right hand wall portion and a lower left hand wall portion form together a composite paraboloid-ellipsoid sector whose sections taken in parallel vertical planes form parts of parabolas whereas sections taken in parallel horizontal planes form parts of ellipses. The projection of the resulting partial light beams provides a partially overlapping spot of concentrated light and two lateral flat partial beams.

4 Claims, 1 Drawing Figure

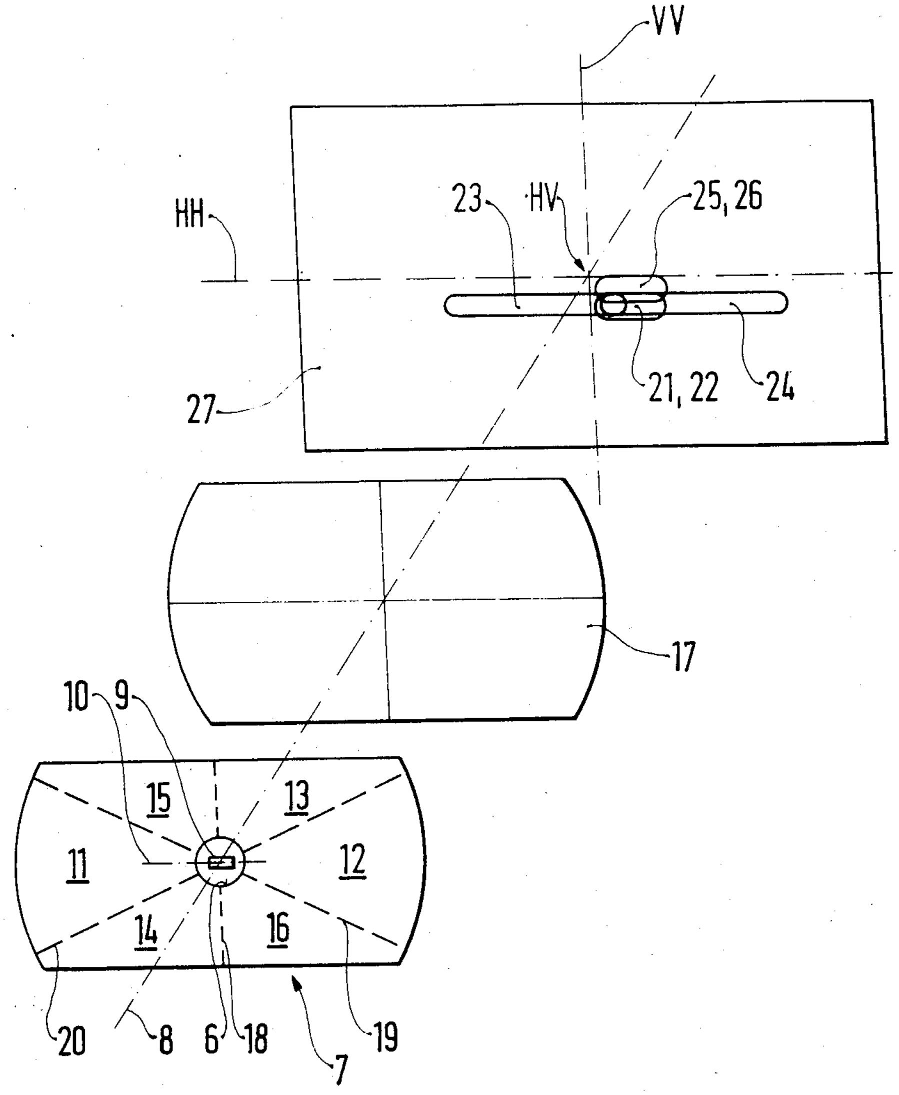
VV
HH
23
HV
25, 26
21, 22
24
27
17
10
9
15
13
11
12
14
16
20
8
6
18
7
19

HEADLAMP, PARTICULARLY OF RECTANGULAR CONFIGURATION, FOR USE AS ANTIDAZZLE LAMP ON MOTOR VEHICLES

BACKGROUND OF THE INVENTION

The present invention relates to a headlamp, particularly to a lamp having a rectangular configuration such as used in antidazzle or low beam headlights on motor vehicles. The headlamp includes a reflector and an incandescent filament of cylinder configuration whose cylinder axis extends horizontally and at right angles to the optical axis of the reflector; the point of gravity of the cylindrical incandescent filament is located at the focal point of the reflector. The headlamp further includes a projecting lens and optical light distributing means.

Headlights of this kind to be authorized in U.S.A. must produce an antidazzle light beam according to current U.S. regulations. In contrast to antidazzle lamps produced according to European standards, the U.S. antidazzle headlamp has no distinct light-dark limit and consequently the protection from glare from the opposite traffic and an accurate adjustment of the headlamp as well as the discernibility on part of the driver do not take advantage of optical possibilities of the lamp.

SUMMARY OF THE INVENTION

It is, therefore, an object of this invention to provide an improved antidazzle headlight of the above described kind which by simple technological means avoids the disadvantages of prior art solutions.

In particular it is an object of this invention to provide such an improved low beam headlamp which permits a more accurate adjustment of the projected light beam in such a manner as to reduce the dazzle of drivers in opposite traffic.

Another object of this invention is to provide such an improved low beam headlamp which increases the preceptibility or discernibility or visual perceptions of the driver.

Still another object of this invention is to provide a low beam headlamp which emits a flat light beam fanned or spread to both sides of a roadway so that the rims of the roadway are illuminated with increased intensity in order to improve the orientation of the driver on the roadway.

In keeping with these objects and others which will become apparent hereafter, one feature of this invention resides, in the headlamp of the above described kind, in the provision of a reflector which when viewed in the direction of its optical axis defines two lateral wall portions forming together a first paraboloid sector defining a center axis and a focal point; an upper left hand wall portion and a lower right hand wall portion forming together a second parabolic sector defining a central axis and a focal point; an upper right hand wall portion and a lower left hand wall portion forming together a composite paraboloid-ellipsoid sector, in which sections taken in planes parallel to the cylinder axis of the incandescent filament coil form parts of ellipses while sections taken in parallel planes perpendicular to the cylinder axis form parabolas.

In a further elaboration of this invention, the central axis of the second paraboloid sector is inclined upwardly relative to the central axis of the first paraboloid sector. In this manner, the spot of concentrated light in the emitted light beam is increased. Preferably, the focal length of the first paraboloid sector is greater than the focal length of the second paraboloid sector and of the composite paraboloid-ellipsoid sector. In this manner, the light effect of the headlamp is further increased.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The sinle FIGURE illustrates schematically a perspective rear view of a rectangular low beam headlamp of this invention, shown in front of a measuring screen. The measuring screen indicates the projection of the light beam unaffected by the light distributing optical means.

DESCRIPTION OF THE PREFERRED EMBODIMENTS

The illustrated rectangular antidazzle headlight for motor vehicles having a light distribution according to U.S. regulations includes a rectangular reflector 7 defining an optical axis 8 and a focal point in which a center of gravity of an incandescent filament in the form of a cylindrical coil 9 is arranged. In front of the reflector there is provided a projection lens 17 and non-illustrated optical light distributing means. The light reflecting surface of the wall of the reflector 7 is divided into six surface portions or zones 11 through 16 delimited by a vertical plane of symmetry 18 and two diagonal planes of symmetry 19 and 20 intersecting on the optical axis 8.

According to this invention, an intermediate zone corresponding to lateral wall portions 11 and 12 form together a first paraboloid sector;

an upper right hand wall portion 13 and a lower left hand wall portion 14 form together a composite paraboloid-ellipsoid sector whose sections taken in parallel vertical planes form parabolas while sections taken in horizontal planes form ellipses; and an upper left hand wall portion 15 and a lower right hand wall portion 16 form together a second paraboloid sector whose central axis is inclined upwards relative to the central axis of the first paraboloid sector;

the inclination amounts to about 0.8° to include the upper half of the incandescent coil 9. In this example, the position of the focal point of the first paraboloid sector and of focal points of the second paraboloid sector and of the composite paraboloid-ellipsoid sector are substantially identical. Moreover, the first paraboloid sector has a relatively large focal length whereas the second paraboloid and the composite paraboloid-ellipsoid sector has a smaller focal length.

A measuring screen 27 is located approximately 10 meters in front of the headlamp at right angles to the optical axis 8. The measuring screen is divided by intersecting vertical coordinate VV and a horizontal coordinate HH. The intersection or focal point is indicated by HV. Light generated by incandescent filament 9 and reflected by the zones 11 through 16 of the reflector 7 produce the following distribution of partial light beams:

The zones 11, 12 produce a partial light beam 21, 22 projected as a first spot 21,22 of concentrated light;

zones 15, 16 generate partial light beam 25, 26 forming a second spot of concentrated light located above and partially overlapping the first mentioned spot 21, 22;

the zone 13 projects a flat partial light beam 23 spread out or dispersed to the left; and the zone 14 projects a flat partial light beam 24 dispersed to the right whereby both partial light beams 23 and 24 partially overlap each other and the two spots 21, 22 and 25, 26 thus increasing light intensity in the overlapped area.

While the invention has been illustrated and described as embodied in a specific embodiment of a low beam headlamp, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claim:

1. A headlamp of a rectangular configuration for use as an antidazzle headlamp in motor vehicles, comprising a rectangular reflector defining a vertical plane and diagonal planes of symmetry, an optical axis and focal point; an incandescent filament in the form of a cylindrical coil whose cylinder axis extends horizontally at right angles to the optical axis and whose center of gravity is located at said focal point; optical means for distributing light emitted by the incandescent filament; said reflector being divided into three pairs of diametrically opposed surface portions, the portions of a first pair extending horizontally and being delimited by intersection lines of the reflectior with the diagonal planes of symmetry, said first pair of surface portions having the shape of a sector of a first paraboloid; the surface portions of a second pair when viewed in the direction of said optical axis corresponding to upper right-hand and lower left-hand areas delimited by intersection lines of the reflector with the vertical plane and one diagonal plane, said second pair of surface portions forming together a sector of composite eliposoid-paraboloid whose vertical sections are parabolas nad horizontal sections are elipses; and the surface porions of the third pair corresponding to upper left-hand and lower right-hand areas delimited by intersection lines of the reflector with the vertical plane and the other diagonal plane, and said third pair of surface portions having the shape of a sector of a second paraboloid whose center axis is inclined upwardly relative to a center axis of said first paraboloid.

2. A headlamp as defined in claim 1, wherein the first paraboloid sector has greater focal length than the focal length of the second paraboloid sector and of the composite paraboloid-ellipsoid sector in the upper and lower zones.

3. A headlamp as defined in claim 1, wherein the position of focal points of the first paraboloid sector, of the second paraboloid sector and of the composite paraboloid-ellipsoid sector are substantially identical.

4. A headlamp as defined in claim 1, wherein the inclination of the central axis of the second paraboloid sector relative to the central axis of the first paraboloid sector amounts to about 0.8°.

* * * * *